United States Patent
Obukhov et al.

(10) Patent No.: US 8,909,942 B1
(45) Date of Patent: Dec. 9, 2014

(54) MRAM-BASED SECURITY FOR DATA STORAGE SYSTEMS

(75) Inventors: Dmitry S. Obukhov, San Jose, CA (US); Afshin Latifi, San Jose, CA (US); Justin Jones, Redwood City, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/436,327

(22) Filed: Mar. 30, 2012

(51) Int. Cl.
*G06F 12/14* (2006.01)

(52) U.S. Cl.
CPC .... *G06F 12/1408* (2013.01); *G06F 2221/2143* (2013.01); *Y10S 257/922* (2013.01)
USPC ............. 713/193; 713/194; 713/189; 380/28; 380/44; 380/52; 380/277; 257/659; 257/660; 257/922; 711/E12.091; 711/E12.092; 711/163; 726/9; 726/17; 726/26; 726/33

(58) Field of Classification Search
CPC .......................... G06F 21/80; G06F 2221/2143
USPC .......................................... 380/277; 713/193
See application file for complete search history.

(56) References Cited

U.S. PATENT DOCUMENTS

| | | | |
|---|---|---|---|
| 5,790,670 A * | 8/1998 | Bramlett .......................... 380/52 |
| 6,891,474 B1 * | 5/2005 | Fletcher ...................... 340/572.1 |
| 7,224,634 B2 | 5/2007 | Lenssen et al. |
| 7,468,664 B2 | 12/2008 | Daughton et al. |
| 7,577,021 B2 | 8/2009 | Guo et al. |
| 7,712,147 B2 | 5/2010 | Lenssen et al. |
| 7,755,933 B2 | 7/2010 | Guo et al. |
| 8,167,057 B2 * | 5/2012 | Gabelich ........................ 173/194 |
| 8,370,648 B1 * | 2/2013 | Natanzon ....................... 713/193 |
| 2001/0033012 A1 * | 10/2001 | Kommerling et al. ......... 257/679 |
| 2004/0066296 A1 * | 4/2004 | Atherton ..................... 340/572.1 |
| 2005/0151777 A1 * | 7/2005 | Silverbrook ..................... 347/19 |
| 2006/0108668 A1 * | 5/2006 | Knudsen ....................... 257/659 |
| 2006/0146597 A1 | 7/2006 | Lenssen et al. |
| 2006/0179490 A1 | 8/2006 | Lenssen et al. |
| 2006/0253667 A1 * | 11/2006 | Merry et al. ................... 711/159 |
| 2007/0159710 A1 * | 7/2007 | Lucas et al. ...................... 360/75 |
| 2007/0220277 A1 * | 9/2007 | Osaki ............................ 713/193 |
| 2008/0072071 A1 * | 3/2008 | Forehand et al. .............. 713/193 |
| 2008/0155262 A1 * | 6/2008 | Beaver et al. .................. 713/173 |
| 2008/0162791 A1 | 7/2008 | Eldredge et al. |
| 2009/0052664 A1 * | 2/2009 | Goodman et al. ............... 380/44 |

(Continued)

OTHER PUBLICATIONS

Peter Gutmann, Secure Detection of Data from Magnetic and Solid-State Memory, Sixth USENIX Security Symposium Proceedings (Jul. 22-25, 1996) (available at https://www.cs.auckland.ac.nz/~pgut001/pubs/secure_del.html).*

*Primary Examiner* — Morshed Mehedi
*Assistant Examiner* — Sharon Lynch (57) ABSTRACT

A secure data storage system includes a mechanism that can be activated to inhibit access to stored data. In one embodiment, access to stored data can be prevented without having to erase or modify such data. An encryption key, or data used to generate the encryption key, is stored in an MRAM module integrated within the data storage system. The data storage system uses the encryption key to encrypt data received from a host system, and to decrypt the encrypted data when it is subsequently read by a host system. To render the stored data inaccessible, an operator (or an automated process) can expose the MRAM module to a magnetic field of sufficient strength to erase key data therefrom.

17 Claims, 7 Drawing Sheets

(56) References Cited

U.S. PATENT DOCUMENTS

| | | | |
|---|---|---|---|
| 2009/0052665 A1* | 2/2009 | Goodman et al. | 380/44 |
| 2010/0058077 A1* | 3/2010 | Matsuda et al. | 713/194 |
| 2010/0131773 A1* | 5/2010 | Cherian et al. | 713/193 |
| 2010/0146641 A1 | 6/2010 | Lenssen et al. | |
| 2010/0250957 A1* | 9/2010 | Cuppett | 713/186 |
| 2010/0299555 A1* | 11/2010 | Jepson et al. | 714/5 |
| 2010/0306551 A1* | 12/2010 | Meyer et al. | 713/189 |
| 2011/0222685 A1 | 9/2011 | Kim et al. | |
| 2012/0093318 A1* | 4/2012 | Obukhov et al. | 380/277 |

* cited by examiner

MRAM-BASED SECURITY FOR DATA STORAGE SYSTEMS

BACKGROUND

1. Technical Field

This disclosure relates to data storage systems, such as solid state drives, for computer systems. More particularly, the disclosure relates to securely storing data in data storage systems and preventing access to stored data.

2. Description of the Related Art

Various types of sensitive data, such as financial information, personal information, medical records, and so on, can be stored in data storage systems. In certain situations, data storage systems containing sensitive data are being maintained in secure locations, such as data centers. However, circumstances arise when data storage systems need to be moved from a secure location to another location. In such situations, existing regulations (e.g., Gramm-Leach-Bliley Act, Health Insurance Portability and Accountability Act, etc.) may require that sensitive data stored in a data storage system be protected from access (e.g., cryptographically erased) before the data storage system is moved from the secure location. A secure erase operation during which stored data is erased or written over several times can, in some instances, take 2-3 days for some large capacity data storage systems. Additional problems can arise when the data storage system has failed. In such situations, it is difficult to secure or erase data stored in a data storage system. Accordingly, there is a need for efficient mechanisms that quickly prevent access to stored data.

BRIEF DESCRIPTION OF THE DRAWINGS

Systems and methods that embody the various features of the invention will now be described with reference to the following drawings, in which.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Overview

It is desirable to provide the ability to efficiently prevent access to sensitive data stored in a data storage system. Advantageously, a security mechanism is configured to prevent access without having to erase or modify (e.g., encrypt) data that is already stored in the data storage system. This is especially beneficial in a data center setting in which hundreds or more data storage systems are housed. The security mechanism is further configured to prevent access to data (or cryptographically erase data) in situations when the data storage system is rendered inoperable.

In some embodiments of the present invention, a security mechanism is configured so that previously encrypted data stored in the data storage system is left unmodified while an encryption key or information used to generate the key is erased or otherwise rendered inaccessible (e.g., performing a cryptographic erase). The security mechanism advantageously encrypts user data transparently to (e.g., without knowledge of) the host system so that encrypted data is stored on a storage medium. When stored data is retrieved, the security mechanism decrypts the data before it is provided to the host system. Further, the security mechanism is integrated with the data storage system. This can make tampering, hacking, or reverse engineering more difficult while providing an operator-friendly, efficient, quick, and easy to use mechanism of sanitizing the data storage system.

In some embodiments of the present invention, the security mechanism utilizes an encryption key which is stored in, or is generated from information stored in, a non-volatile memory module, such as a magnetoresistive random access memory (MRAM) module, integrated in the data storage system. Data stored in the MRAM module can be erased, written over, or otherwise rendered unrecoverable by exposing the MRAM module to a suitable electromagnetic field (e.g., magnetic field of a sufficient strength). For example, data stored in the MRAM module can be erased by degaussing, such as by using a degausser configured to erase data stored in magnetic media. As another example, the data storage system can comprise a magnetic field generator that can be activated (e.g., by supplying external power) to erase data stored in the MRAM module. Advantageously, by erasing data stored in the MRAM module, access to encrypted data stored in the data storage system can be prevented even in cases when the data storage system has failed or has otherwise been rendered inoperative or nonfunctional. Thus, some embodiments provide a method of preventing access that is very fast compared to other methods that physically erase all user data in storage devices, whose required time of operation has increased dramatically as data capacity per device has increased.

In some embodiments of the present invention, the data storage system is configured to erase from the MRAM module or otherwise render unrecoverable (e.g., written over) the encryption key or information from which the encryption key is generated. For example, this can be performed in response to a command (e.g., a vendor specific command that is not part of standard command interface between a host system and the data storage system) received from a host system. Once the key or information from which the key is generated is erased, encrypted data stored in the data storage system cannot be decrypted, and access is prevented. As a result, the data storage system is sanitized.

System Overview

Figure 1A:
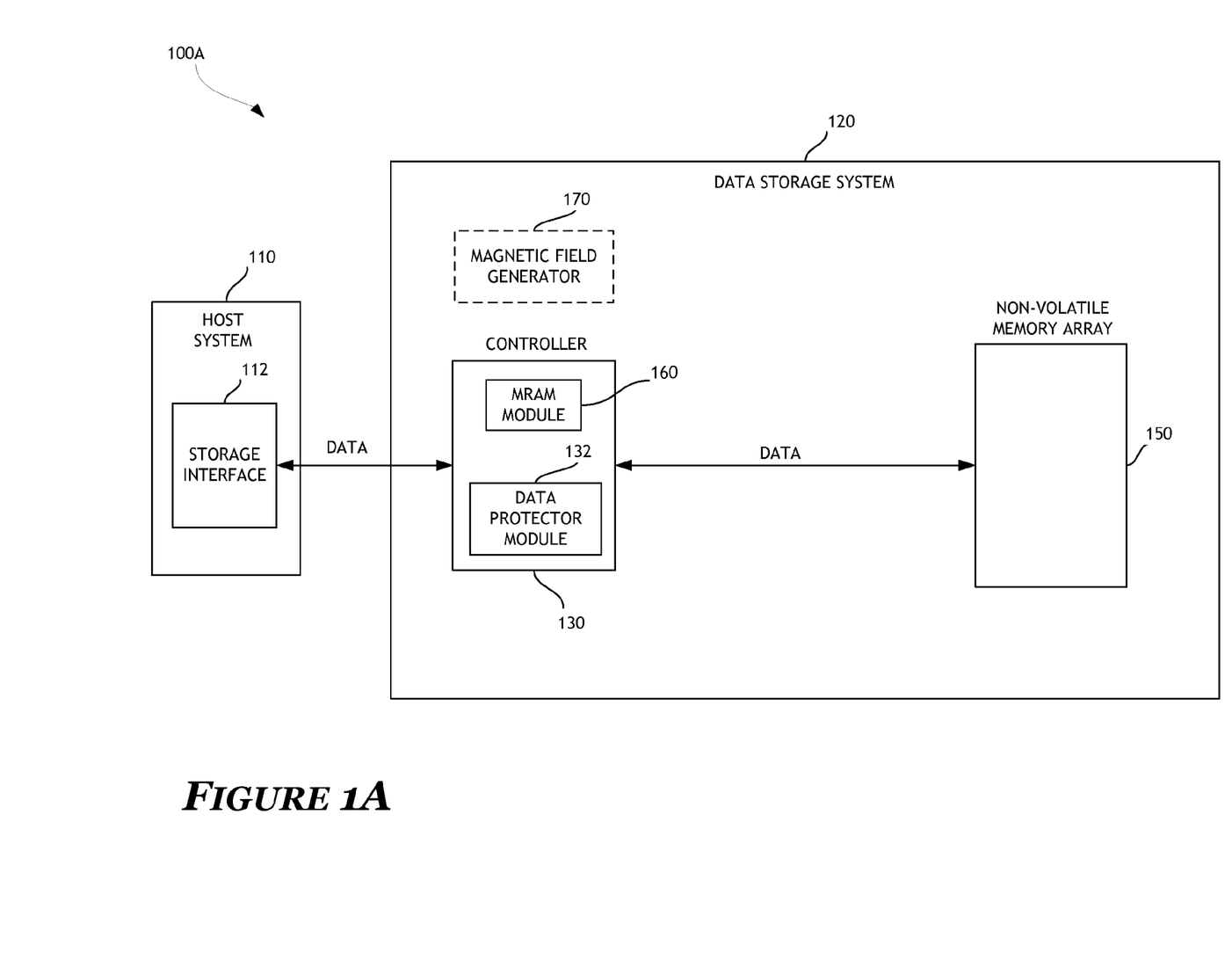
FIG. 1A illustrates a combination of a host system and a data storage system that implements MRAM-based security according to one embodiment of the invention.

FIG. 1A illustrates a combination 100A of a host system and a data storage system that implements MRAM-based security according to one embodiment of the invention. As is shown, the data storage system 120 (e.g., a hard disk drive, hybrid disk drive, solid-state drive, etc.) includes a controller 130 and a non-volatile memory array 150. The non-volatile memory array 150 comprises non-volatile memory, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof. The data storage system 120 can further comprise other types of storage (not shown), such as one or more magnetic storage modules.

The controller 130 can be configured to receive data and/or storage access commands from a storage interface module 112 (e.g., a device driver) of a host system 110. Storage access commands communicated by the storage interface 112 can include write data and read data commands issued by the host system 110. Read and write commands can specify a logical address (e.g., LBA) used to access the data storage system 120. The controller 130 can execute the received commands in the non-volatile memory array 150 and/or other storage modules (not shown).

Data storage system 120 can store data communicated by the host system 110. In other words, the data storage system 120 can act as memory storage for the host system 110. To facilitate this function, the controller 130 can implement a logical interface. The logical interface can present to the host system 110 data storage system's memory as a set of logical addresses (e.g., contiguous address) where host data can be stored. Internally, the controller 130 can map logical addresses to various physical locations or addresses in the non-volatile memory array 150 and/or other storage modules.

The controller 130 includes a data protector module 132 that implements a security mechanism (e.g., MRAM-based security) for preventing access to data stored in the data storage system 120. The controller also comprises an MRAM module 160 where an encryption key or information used to generate the encryption key is stored. In order to prevent access to the data storage system 120, data stored in the MRAM module 160 can be erased either under control of the controller 130 and/or the data protector module 132 or by applying magnetic field to erase data stored in the MRAM module 160. In one embodiment, the magnetic field can be applied by a magnetic field generator 170 integrated within the data storage system 120. For example, an operator can apply external power to the magnetic field generator 170 (e.g., a coil or coils) whose power connectors or terminals are exposed for this purpose. In another embodiment, the magnetic field generator 170 is external to the data storage system 120 (e.g., a degausser).

Figure 1B:
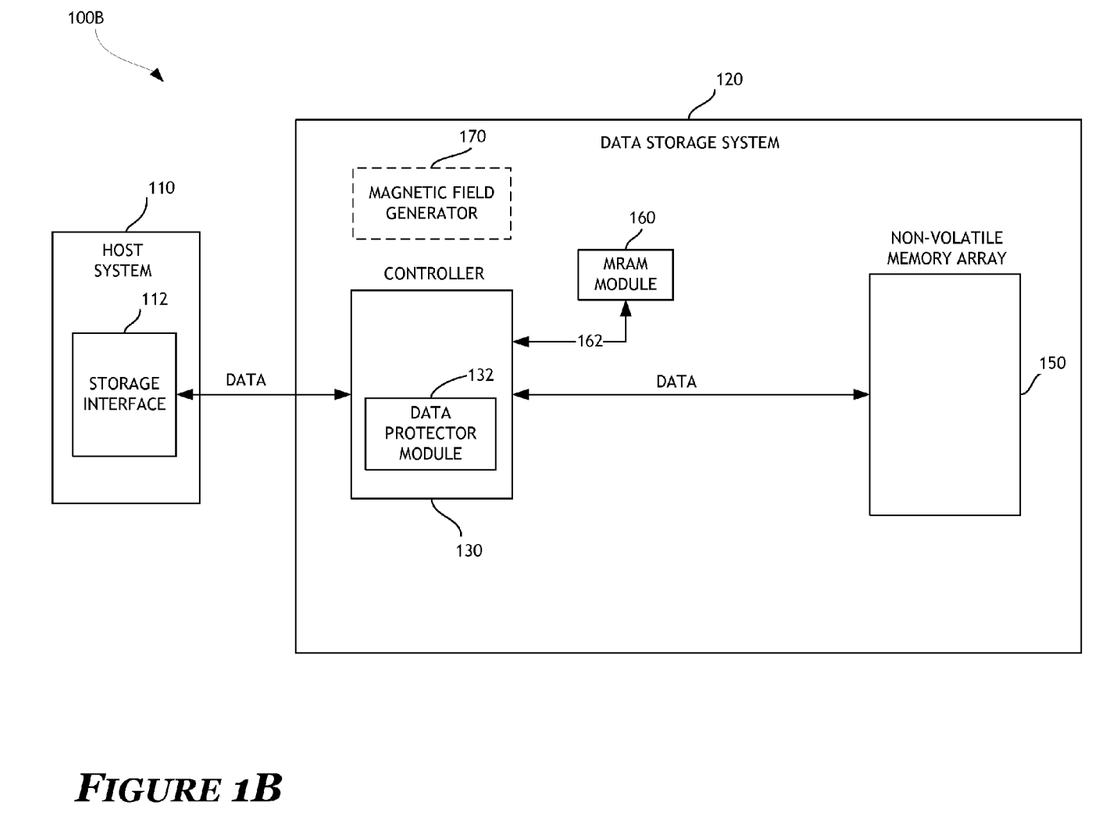
FIG. 1B illustrates a combination of a host system and a data storage system that implements MRAM-based security according to another embodiment of the invention.

FIG. 1B illustrates a combination 100B of a host system and a data storage system that implements MRAM-based security according to another embodiment of the invention. As is illustrated, the MRAM module 160 is positioned outside the controller 130, and is connected to the controller via an interface 162. For example, the MRAM module 160 can be positioned on the same printed circuit board (PCB) as the controller 130. Other components of the combination 100B are described above.

MRAM-Based Security

Figure 2:
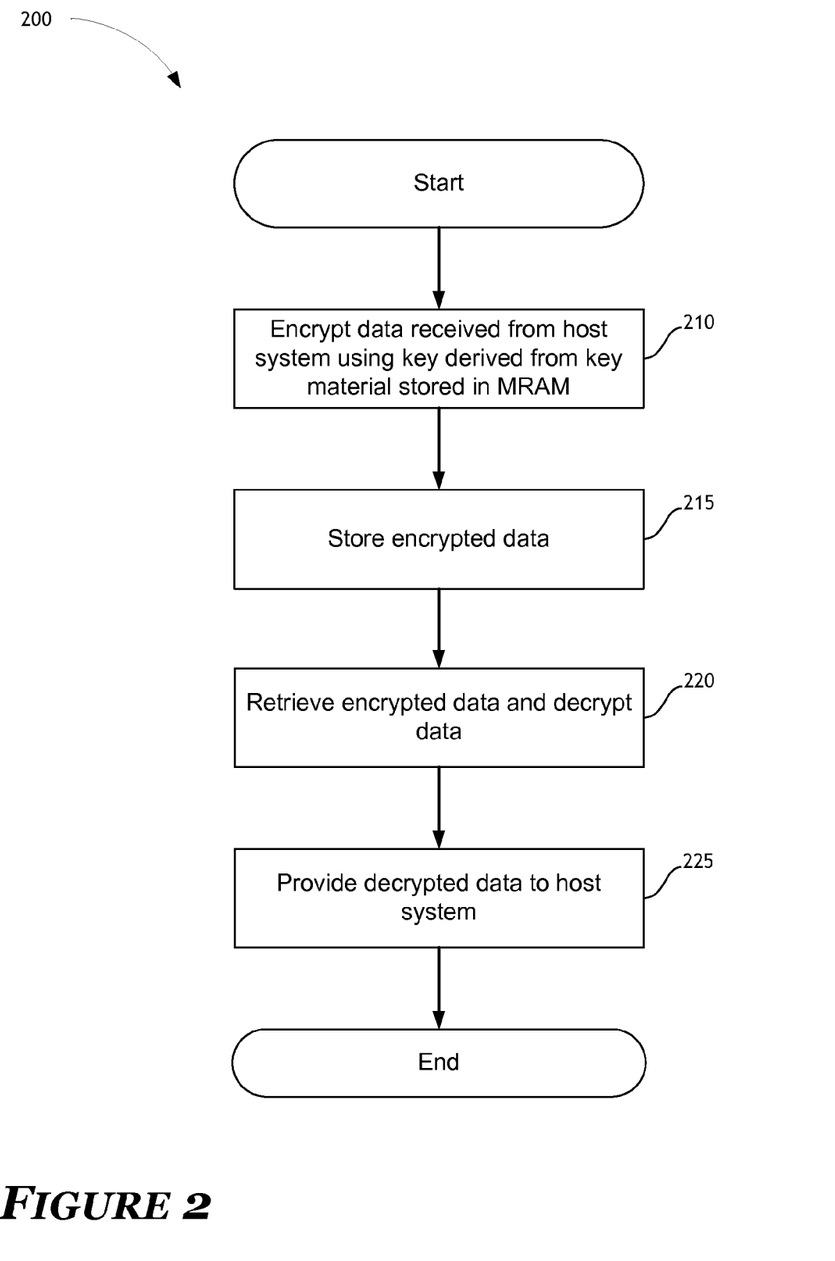
FIG. 2 is a flow diagram illustrating a process of securely storing data according to one embodiment of the invention.

FIG. 2 is a flow diagram illustrating a process 200 of securely storing data according to one embodiment of the invention. The process 200 can be executed by the controller 130 and/or the data protector module 132. The process 200 starts in block 210 where it encrypts data received from the host system 110. This can be performed in response to receiving a write data command from the host system. In one embodiment, as is further explained below, the data is encrypted using a key (e.g., an encryption key) generated or derived from key data or material stored in the MRAM module 160. The encrypted data is stored in the data storage system 120 (e.g., in the non-volatile memory array 150) in block 215. In block 220, the process 200 retrieves the stored encrypted data and decrypts it using the encryption key. This can be performed in response to receiving a read data command from the host system 110. In block 225, the process 200 provides decrypted data to the host system. Accordingly, the process of securely storing data by encrypting or decrypting it is performed transparently to (e.g. without knowledge of) the host system 110. In another embodiment, key data comprises the encryption key itself.

Figure 3:
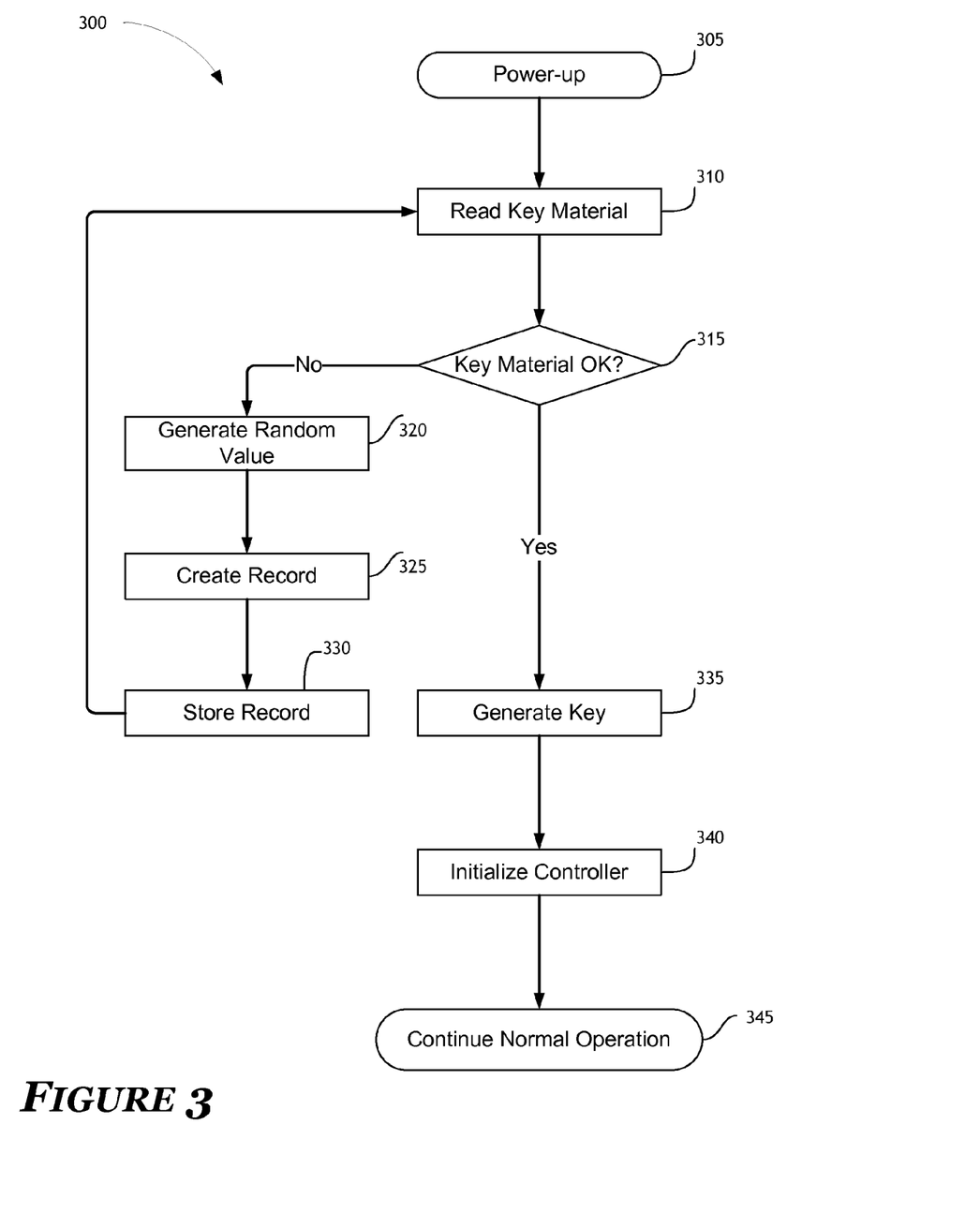
FIG. 3 is a flow diagram illustrating a process of initializing a data storage system according to one embodiment of the invention.

FIG. 3 is a flow diagram illustrating a process 300 of initializing a data storage system 120 according to one embodiment of the invention. The process 300 can be executed by the controller 130 and/or the data protector module 132. The process 300 begins in block 305 when the data storage system 120 is initialized (e.g., powered up). In block 310, the process attempts to read key data or a record comprising key data (described below) stored in the MRAM module 160. In block 315, the process determines whether it successfully retrieved key data or the record comprising key data. In case key data (or the record) was successfully read, the process 300 transitions to block 335 where it generates an encryption key using key data. In one embodiment, the key is generated using a key derivation function (KDF) applied to key data and a randomly generated number (e.g., 1024 bits):

$$\text{Key}=\text{KDF}(\text{key data},\text{seed}) \qquad (1)$$

The seed value in equation (1) is the random number, which functions as cryptographic salt in order to prevent lookup table assisted dictionary attacks and other hacking attempts. The random number can be unique to each data storage system 120. In one embodiment, the key is generated by applying a key derivation function to the randomly generated number as follows:

$$\text{Key}=\text{KDF}(\text{random number}) \qquad (2)$$

The key derivation function of equations (1) and/or (2) can be configured to be slow (e.g., undergo a number of iterations for generating the key) in order to prevent brute force attacks, dictionary attacks, and the like. In one embodiment, any suitable key derivation function can be used, such as KDF1, KDF2, KDF3, KDF4, password-based key derivation function (e.g., PBKDF2), message authentication code (MAC)-based key derivation function, hash-based message authentication code (HMAC)-based key derivation function, etc. In another embodiment, another suitable process for generating an authentication key can be used.

In one embodiment, key data can be protected by an error correction code (ECC) value configured to recover key data in case of memory errors. The ECC value is utilized by the ECC process to correct memory errors and recover key data. The ECC value can be stored in the MRAM module 160 or another storage module of the data storage system 120, such as the non-volatile memory array 150. In one embodiment, an authentication field can be used to protect the authenticity of key data. The authentication field can be derived or generated using a cryptographic hash function, such as SHA-2 and the like. The authentication field can be used to protect key data from a hacking attempt. For example, the following record comprising key data can be stored in the MRAM module 160:

$$\text{struct security}\{\text{key data;random number;ECC value;} \\ \text{authentication value}\} \qquad (2)$$

In one embodiment, the key generated from key data, such as by using equations (1) or (2), can be a key encryption key used to access the encryption key stored in the data storage system 120 (e.g., in the non-volatile memory array 150), which is used for encrypting and decrypting data stored in the data storage system. In one embodiment, the encryption key itself can be stored in the MRAM module 160, and key data is not used. In one embodiment, the random number is used as key data for generation of the encryption key, such as by using equation (2).

In case key data or the record comprising key data was not successfully read, the process 300 transitions to block 320. Key data (or the record comprising key data) may not be accessible when the MRAM module 160 was not properly initialized, when data stored in the MRAM module was erased or overwritten, when the storage system has failed, etc. As is illustrated, the process generates a random number (e.g., 1024 bit random number) in block 320, which is used as cryptographic salt to generate the key using equation (1) or to directly generate the key using equation (2). In block 325, the process 300 regenerates the record (such as record (2)) by computing or deriving the ECC value and the authentication field. The process 300 transitions to block 330 where it stores the record in the MRAM module 160. The process 300 transitions to block 310 where the process again attempts to read key data or the record comprising key data. If the process 300 successfully retrieves key data or the record comprising key data, the process transitions to block 335. In block 335, the process 300 generates the encryption key using key data. In block 340, the process 300 initializes the controller 130, and normal operation is continued in block 345.

In one embodiment, if key data cannot be accessed or retrieved, the process 300 indicates (not shown) that the data storage system 120 cannot be properly initialized and that stored data is not accessible. In such case, the data storage system 120 may need to be reformatted and a new or replacement key data value may need to be stored in the MRAM module 160. In another embodiment, if key data cannot be accessed or retrieved, the process 300 can generate a replacement key data according to the rules used to generate key data, such as by generating a new random number used to generate a new or replacement key.

Figure 4:
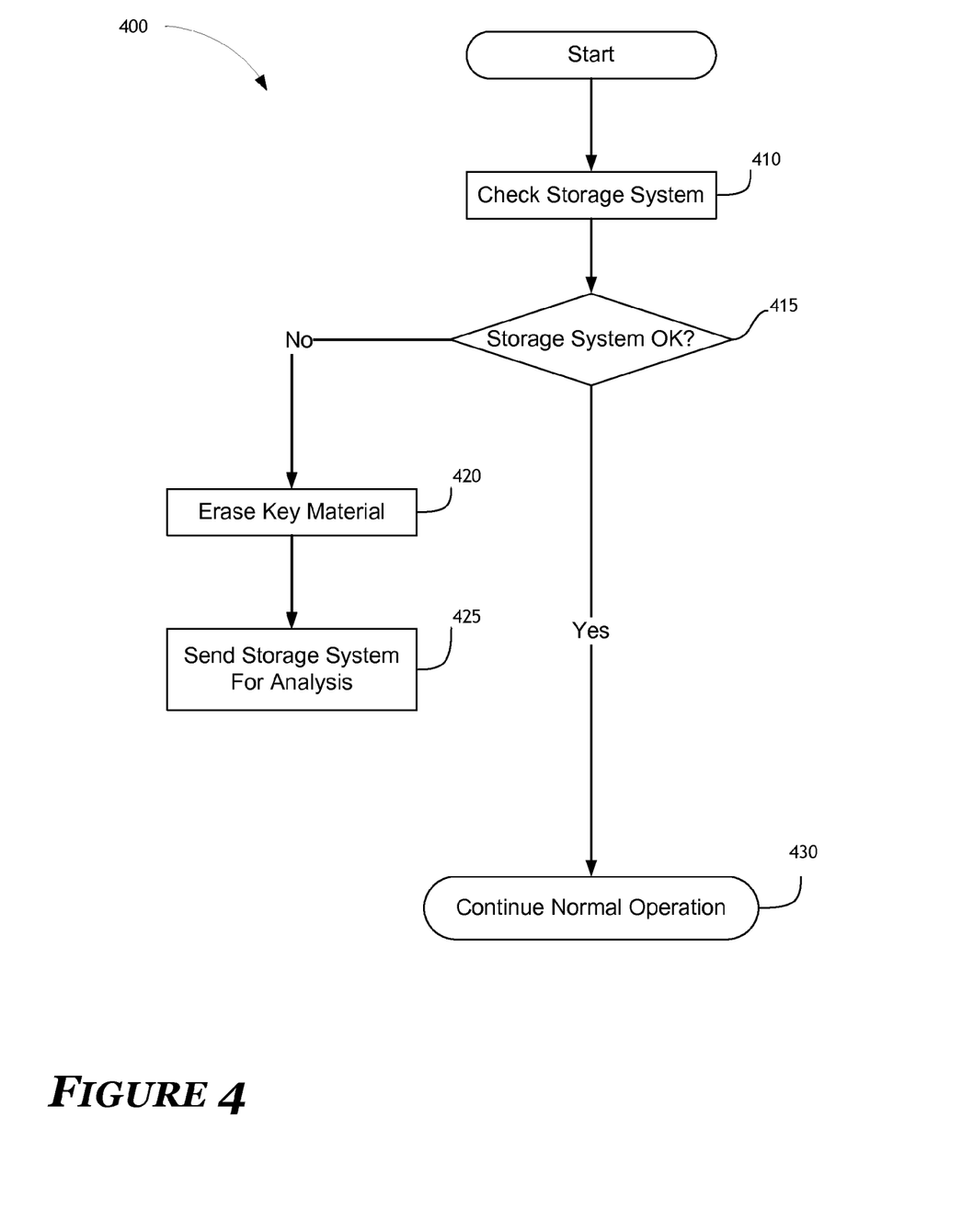
FIG. 4 is a flow diagram illustrating prevention of access to stored data according to one embodiment of the invention.

FIG. 4 is a flow diagram illustrating a process 400 for prevention of access to stored data (e.g., sanitization of the data storage system) according to one embodiment of the invention. The process 400 can be executed by the controller 130 and/or the data protector module 132. The process 400 begins in block 410 where it determines whether the data storage system 120 is operating normally. For example, following a system error (which may result in a reset of the data storage system 120), a hardware test can be performed, interrupts can be checked, memory test can be performed, and the like. If the process 400 determines that the data storage system 120 is operating normally, it transitions to block 430 where the data storage resumes regular operation. On the other hand, if the process 400 determines that the data storage system 120 is experiencing a severe error or has otherwise failed or became nonfunctional, the data storage system may have to be sent for repair or failure analysis. For example, the data storage system 120 may be sent to the manufacturer for fault analysis.

In one embodiment, the data storage system 120, should be secured or sanitized so that access to sensitive data is prevented. This should be performed before the storage system leaves a protected facility (e.g., a data center). When the data storage system 120 is operational, access can be prevented by erasing data stored in the MRAM module 160, in which the encryption key, key data or the record comprising key data is stored. Once the key or key data has been erased, stored data cannot be decrypted. However, when the data storage system 120 has failed or is otherwise rendered nonfunctional, data stored in the MRAM module 160 can be erased by applying magnetic field of sufficient strength to disrupt the recorded magnetic cells. In block 420, data stored in the MRAM module is erased or written over. In one embodiment, this can be accomplished by the operator applying external power to terminals of the magnetic field generator 170. In another embodiment, the operator can use a degausser, which utilizes a permanent magnet, electromagnet, etc. In yet another embodiment, access to data stored in the data storage system 120 can be prevented by erasing data stored in the MRAM module 160 using a permanent magnet. Once data stored in MRAM module 160 has been erased, the data storage system 120 has been sanitized. In one embodiment, the data storage system 120 can include a visual, audible, etc. indicator (e.g., an LED) for signaling to the operator that access to data stored in the data storage system has successfully been prevented.

In block 425, the sanitized data storage system 120 can be shipped from the protected facility for failure analysis, end of life disposal, transfer to another facility, and the like. In case the data storage system 120 has failed, it may be reused by fixing the problem that caused the failure, performing formatting of the storage module(s) (e.g., the non-volatile memory array), and regenerating key data or the record.

Figure 5A:
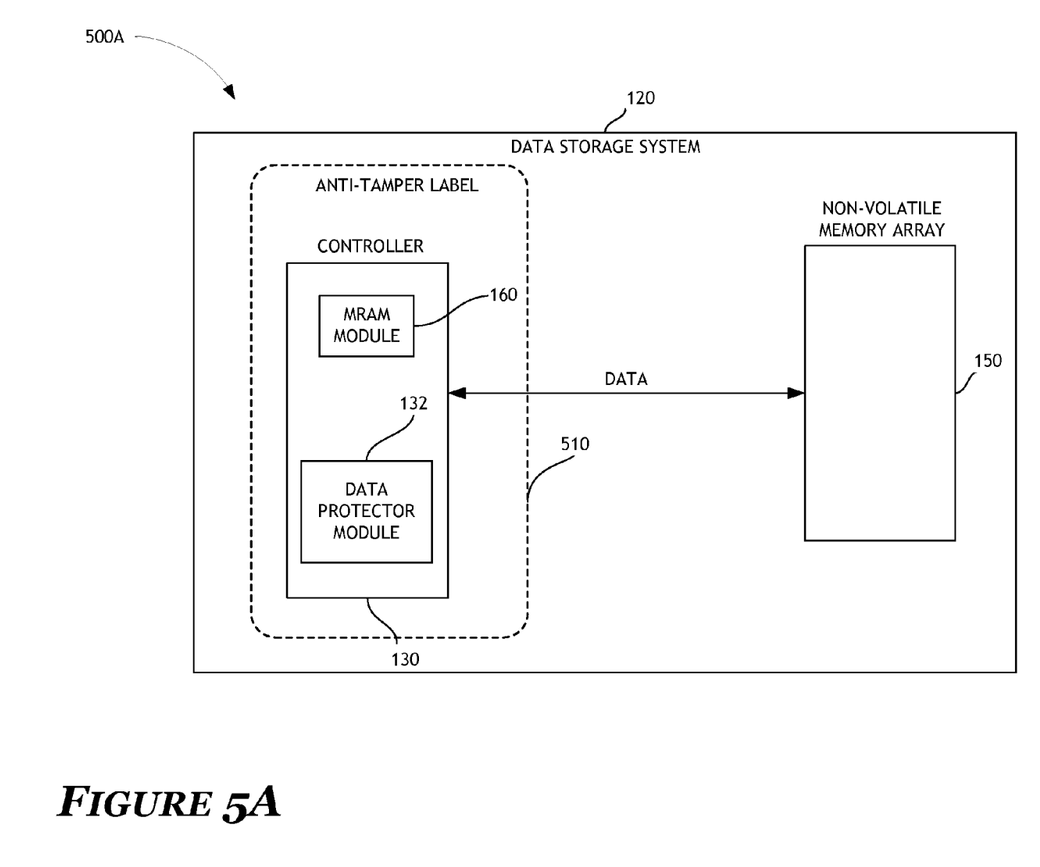
FIG. 5A illustrates a data storage system that comprises an anti-tampering label according to one embodiment of the invention.

FIG. 5A illustrates a data storage system 500A that comprises an anti-tampering label 510 according to one embodiment of the invention. One of the ways to hack the data storage system in order to gain access to data stored in the data storage system is to forge the contents of the MRAM module 160 in order to obtain key data or the encryption key. In one embodiment, this can be prevented by placing the anti-tampering label 510 over the controller 130, which includes the MRAM module 160. The anti-tampering label 510 indicates whether the data storage system 500A, and particularly the MRAM module 510, has been tampered with. Existing regulations, such as Federal Information Processing Standards (FIPS) 140, require anti-tampering labels (e.g., label 510) to protect a cryptographic module.

In one embodiment, the anti-tampering label 510 is also configured as an electromagnetic (or RF) shield, which protects parts of the controller 130 from magnetic field that may be applied to erase data stored in the MRAM module 160. In another embodiment, a separate RF shield (not shown) can be integrated in order to protect components of the data storage system (e.g., magnetic storage modules, non-volatile memory array 150, etc.) from magnetic field.

Figure 5B:
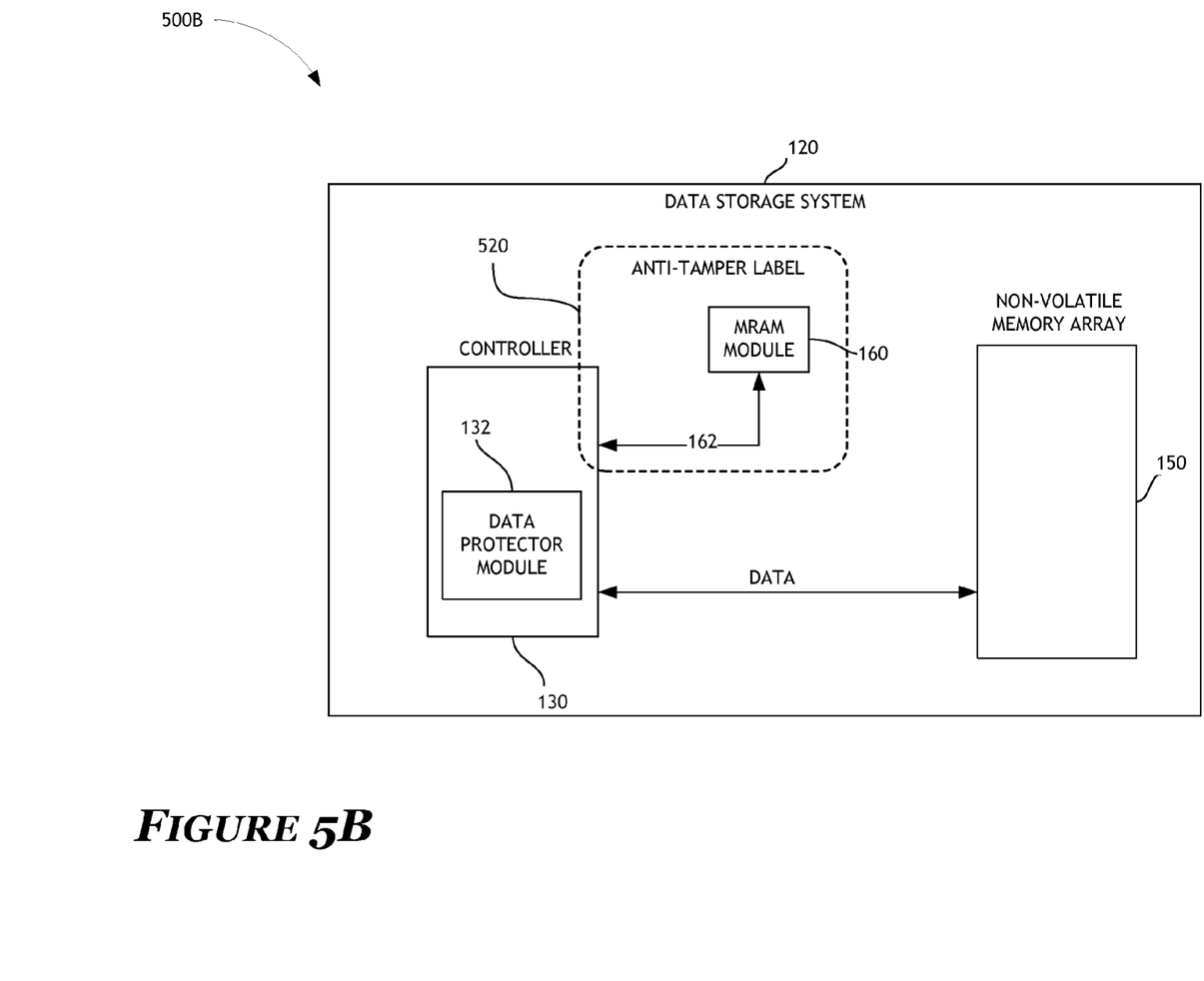
FIG. 5B illustrates a data storage system that comprises an anti-tampering label according to another embodiment of the invention.

FIG. 5B illustrates a data storage system 500B that comprises an anti-tampering label 520 according to another embodiment of the invention. Data storage system 500B comprises the controller 130 and the MRAM module 162 external to the controller. The MRAM module 160 is connected to the controller 130 by the interface 162. The anti-tampering label 520 is positioned over the MRAM module 160 and an interface 162 between the MRAM module 160 and the controller 130. The anti-tampering label 520 indicates whether the MRAM module 160 or the interface 162 have been tampered with.

Conclusion

Embodiments of secure data storage systems disclosed herein are configured to efficiently prevent access to stored data without having to erase or modify user data. Embodiments of secure data storage systems disclosed herein are further configured to prevent access when data storage systems are nonfunctional. In one embodiment, an encryption key and/or information used to generate the encryption key is stored in an MRAM module integrated within a data storage system. Data stored in the data storage system is encrypted using the encryption key. Encryption and decryption of data are performed transparently to a host system. The encryption key or information used to generate the encryption key can be erased or otherwise rendered inaccessible. In addition, if the data storage system has become nonfunctional, data stored in the MRAM module can be erased by application of magnetic field of a sufficient strength. Once the encryption key or information used to generate the encryption key has been erased, access to data stored in the data storage system is prevented, and the data storage system is sanitized.

Other Variations

Those skilled in the art will appreciate that in some embodiments, an encryption key can be stored or generated from information stored in various non-volatile memory modules, such as a smart card, Trusted Platform Module (TPM chip), EEPROM, and the like. Preventing access to data stored in the storage subsystem can be accomplished by destroying the smartcard, destroying the TPM chip, disabling power (e.g., external power) supplied to the EEPROM module, and the like. Additional system components can be utilized, and disclosed system components can be combined or omitted. The actual steps taken in the disclosed processes, such as the processes illustrated in FIGS. 2, 3, and 4, may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, hybrid hard drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage system, comprising:
a non-volatile memory array;
a magnetoresistive random access memory (MRAM) module configured to store key data, the MRAM module configured to store the key data without application of a bias magnetic field and not physically enclosed in a shielding configured to shield the MRAM module from a non-bias magnetic field that renders inaccessible data stored in the MRAM module, the non-bias magnetic field configured to be applied in response to a vendor specific command received from a host system, the key data configured to be:
accessible when the non-bias magnetic field is not applied to the MRAM module, and
rendered inaccessible when the non-bias magnetic field is applied to the MRAM module,
wherein the MRAM module remains stationary relative to the data storage system during application of the non-bias magnetic field, and
wherein when the data storage system has failed, replacement key data is generated by computing an error correction code and an authentication value; and
data protector circuitry configured to:
use the key data stored in the MRAM module to encrypt data received from the host system for storage in the memory array; and
use the key data stored in the MRAM module to decrypt encrypted data read from the memory array,
wherein application of the non-bias magnetic field 1) disables the ability of the data protector circuitry to decrypt encrypted data stored in the memory array, 2) prevents access to data stored in the memory array without erasing any of data stored in the memory array, and 3) renders the key data stored in the MRAM module inaccessible even after the data storage system has failed.

2. The data storage system of claim 1, further comprising a magnetic field generator configured to, when powered, generate the non-bias magnetic field configured to render inaccessible data stored in the MRAM module.

3. The data storage system of claim 1, wherein the memory array comprises solid-state memory.

4. The data storage system of claim 1, wherein the data storage system comprises one of: a solid-state drive or a hybrid hard drive.

5. The data storage system of claim 1, wherein the key data comprises a key used to encrypt and decrypt data.

6. The data storage system of claim 1, wherein the data protector circuitry is further configured to generate a key based at least in part on the key data, the key used to encrypt and decrypt data.

7. The data storage system of claim 1, wherein the data protector circuitry is configured to encrypt the data and decrypt the encrypted data without sharing the key data with the host system.

8. A method of securely storing data in a data storage system, the method comprising:
accessing key data stored in a magnetoresistive random access memory (MRAM) module, the MRAM module storing the key data without application of a bias magnetic field and not physically enclosed in a shielding configured to shield the MRAM module from a non-bias magnetic field that renders inaccessible the key data, the non-bias magnetic field applied in response to a vendor specific command received from a host system;
generating a key based at least in part on the key data;
encrypting data received from the host system using the generated key;
storing the encrypted data in a non-volatile memory array;
decrypting the encrypted data stored in the memory array using the key; and providing the decrypted data to the host system, wherein the key is required to decrypt the encrypted data stored in the memory array, wherein exposing the MRAM module to the non-bias magnetic field 1) disables the functionality of decrypting the encrypted data stored in the memory array, 2) prevents access to data stored in the memory array without erasing any of data stored in the memory array, and 3) renders the key data inaccessible even after the data storage system has failed, wherein the MRAM module remains stationary relative to the data storage system during application of the non-bias magnetic field, wherein when the data storage system has failed, replacement key data is generated by computing an error correction code and an authentication value, and wherein the method is performed under the control of a controller.

9. The method of claim 8, further comprising encrypting data and decrypting the encrypted data without sharing the key with the host system.

10. A data storage system comprising:
a non-volatile memory array configured to store data communicated by a host system;
a magnetoresistive random access memory (MRAM) module configured to store key data, wherein the MRAM module is configured to store the key data without application of a bias magnetic field and not physically enclosed in a shielding configured to shield the MRAM module from a non-bias magnetic field that renders inaccessible data stored in the MRAM module, the non-bias magnetic field configured to be applied in response to a vendor specific command received from the host system, the key data configured to be:
  accessible when the non-bias magnetic field is not applied to the MRAM module, and
  rendered inaccessible when the non-bias magnetic field is applied to the MRAM module,
  wherein the MRAM module remains stationary with respect to the data storage system during application of the non-bias magnetic field, and
  wherein when the data storage system has failed, replacement key data is generated by computing an error correction code and an authentication value; and
a controller configured to:
  generate a key based at least in part on the key data stored in the MRAM module;
  in response to receiving a write command from the host system comprising data, encrypt the data using the key and store the encrypted data in the memory array;
  in response to receiving a read command from the host system to retrieve the data, decrypt the encrypted data using the key and provide the decrypted data to the host system,
  wherein the key is required to decrypt the encrypted data stored in the memory array, and
  wherein application of the non-bias magnetic field 1) disables the ability of the controller to decrypt the encrypted data stored in the memory array, 2) prevents access to data stored in the memory array without erasing any of data stored in the memory array, and 3) renders the key data stored in the MRAM module inaccessible even after the data storage system has failed.

11. The data storage system of claim 10, wherein the controller is further configured to:
in response to receiving the vendor specific command from the host system, render inaccessible the key data stored in the MRAM module, thereby preventing decryption of the encrypted data stored in the memory array.

12. The data storage system of claim 10, further comprising an anti-tampering label configured to indicate whether the data storage system was tampered with.

13. The data storage system of claim 12, wherein the anti-tampering label is configured to be affixed to at least a part of the MRAM module in order to indicate whether the MRAM module or an interface between the MRAM module and the controller were tampered with.

14. The data storage system of claim 9, wherein the controller is configured to encrypt the data and decrypt the encrypted data without sharing the key with the host system.

15. A method of securely storing data in a data storage system, the method comprising:
accessing key data stored in a magnetoresistive random access (MRAM) module, the MRAM module storing the key data without application of a bias magnetic field and not physically enclosed in a shielding configured to shield the MRAM module from a non-bias magnetic field that renders inaccessible data stored in the MRAM module, the non-bias magnetic field applied in response to a vendor specific command received from a host system;
in response to determining that the key data is not successfully accessed, generating a replacement key data and storing the replacement key data in the MRAM module;
generating a key based on the key data or the replacement key data; and
using the key, encrypting data for storing in a non-volatile memory array and decrypting data retrieved from the memory array,
wherein application of the non-bias magnetic field 1) disables the functionality of decrypting data stored in the memory array, 2) prevents access to data stored in the memory array without erasing any of data stored in the memory array, 3) renders the key data or replacement key data stored in the MRAM module inaccessible even when the data storage system has become nonfunctional,
wherein the MRAM module remains stationary with respect to the data storage system during application of the non-bias magnetic field,
wherein when the data storage system has failed, the replacement key data is generated by computing an error correction code and an authentication value, and
wherein the method is performed under the control of a controller.

16. The method of claim 15, wherein accessing the value stored in the MRAM module is performed during start-up of the data storage system.

17. The method of claim 15, further comprising encrypting data and decrypting the encrypted data without sharing the key with the host system.

* * * * *